(12) United States Patent
Engelhardt et al.

(10) Patent No.: US 8,653,683 B2
(45) Date of Patent: Feb. 18, 2014

(54) DEVICE FOR CONTROLLING A DOUBLE-FED ASYNCHRONOUS MACHINE

(75) Inventors: Stephan Engelhardt, Sonsbeck (DE); Joerg Kretschmann, Kempen (DE)

(73) Assignee: Woodward Kempen GmbH, Kempen (DE)

( * ) Notice: Subject to any disclaimer, the term of this patent is extended or adjusted under 35 U.S.C. 154(b) by 0 days.

(21) Appl. No.: 13/111,339

(22) Filed: May 19, 2011

(65) Prior Publication Data

US 2011/0260454 A1 Oct. 27, 2011

Related U.S. Application Data

(63) Continuation of application No. PCT/EP2009/064365, filed on Oct. 30, 2009.

(30) Foreign Application Priority Data

Nov. 19, 2008 (DE) .......................... 10 2008 037 566

(51) Int. Cl.
*H02P 9/42* (2006.01)
(52) U.S. Cl.
USPC ............................................. 290/44; 322/58
(58) Field of Classification Search
USPC ............................................. 290/44; 322/58
See application file for complete search history.

(56) References Cited

U.S. PATENT DOCUMENTS

| 6,566,764 | B2 * | 5/2003 | Rebsdorf et al. ................. 290/44 |
| 7,345,373 | B2 * | 3/2008 | Delmerico et al. .............. 290/44 |
| 7,531,910 | B2 * | 5/2009 | Flottemesch et al. ........... 290/44 |
| 7,560,824 | B2 * | 7/2009 | Hehenberger .................. 290/44 |
| 7,741,728 | B2 * | 6/2010 | Fortmann et al. ............... 290/44 |
| 7,840,312 | B2 * | 11/2010 | Altemark et al. .............. 700/286 |
| 7,960,849 | B2 * | 6/2011 | Lopez Taberna et al. ....... 290/44 |
| 2009/0273185 | A1 * | 11/2009 | Ruiz Flores et al. ............ 290/44 |
| 2010/0283247 | A1 * | 11/2010 | Krueger ......................... 290/44 |
| 2010/0312409 | A1 * | 12/2010 | Zeumer et al. ................ 700/287 |

FOREIGN PATENT DOCUMENTS

| CN | 101 141 111 A | 3/2008 |
| EP | 1 796 259 A2 | 6/2007 |
| WO | WO 2008/131777 A2 | 11/2008 |

OTHER PUBLICATIONS

Durstewitz, Michael, "Netzspezifische Filterauslegung" Kasseler Symposium Energie-Systemtechnik 1998 Oct. 1, 1998, 26 total pages, 12 pages and 14 pages of translation Universität Gesamthochschule Kassel, Kassel, Germany.

Gaillard A et al, "Active Filtering Capability of WECS with DFIG for Grid Power Quality Improvement" IEEE International Symposium on Industrial Electronics 2008 Jun. 30, 2008, pp. 2365-2370, IEEE Piscataway, NJ, USA.

(Continued)

*Primary Examiner* — Michael Zarroli
(74) *Attorney, Agent, or Firm* — Reinhart Boerner Van Deuren P.C.

(57) ABSTRACT

The invention relates to a device and method for controlling a double-fed asynchronous machine (4), preferably for a power plant, in particular for a wind or water power plant. The device includes an indirect converter (6) which is connected on the rotor side to the double-fed asynchronous machine (4). The indirect converter (6) includes a rotor-side converter (20) and a line-side converter (24). At least one control element (8) is provided for controlling the indirect converter (6). At least one software-based and/or hardware-based damping element (40, 46, 48, 120) is provided which has changeable damping characteristics.

21 Claims, 7 Drawing Sheets

(56) References Cited

OTHER PUBLICATIONS

Holtz J et al, "Suppression of Time-Varying Resonances in the Power Supply line of AC Locomotives by Inverter Control" IEEE Transactions on Industrial Electronics Jun. 1, 1992, pp. 223-229, vol. 39, No. 3 IEEE Piscataway, NJ, USA.

Lindholm M et al, "Harmonic Analysis of Doubly Fed Induction Generators" IEEE Fifth International Conference on Power Electronics and Drive Systems Nov. 17, 2003, pp. 837-841, vol. 2 IEEE Piscataway, NJ, USA.

Massing J R et al "Design and Control of Double-Fed Induction Generators with Series Grid-Side Converter" 34th Annual Conference of IEEE Industrial and Electronics Society—IECON 2008 Nov. 10, 2008, pp. 139-145 IEEE Piscataway, NJ, USA.

Durstewitz, Michael, "Netzspezifische Filterauslegung" Kasseler Symposium Energie-Systemtechnik '98 1998, 26 total pages, 12 pages and 10 pages of translation.

G. D. Marques, Comparison of Active Damping Systems for the Doubly-fed Induction Generator, Publication, 2008, 6 pages, IEEE RGION 8 SIBIRCON 2008.

Zhixin Miao et al., "Control of DFIG based Wind Generation to Improve Inter-Area Oscillation Damping", Publication, 2008, 7 pages, IEEE.

\* cited by examiner

DEVICE FOR CONTROLLING A DOUBLE-FED ASYNCHRONOUS MACHINE

CROSS-REFERENCE TO RELATED PATENT APPLICATIONS

This patent application is a continuation of pending PCT Application No. PCT/EP2009/064365, filed Oct. 30, 2009, which claims the benefit of German Application No. 10 2008 037 566.7, filed Nov. 19, 2008, the entire teachings and disclosure of which are incorporated herein by reference thereto.

FIELD OF THE INVENTION

The invention relates to a device for controlling a double-fed asynchronous machine, preferably for a power plant, in particular for a wind or water power plant, comprising an indirect converter which is connected on the rotor side to the double-fed asynchronous machine, the indirect converter comprising a rotor-side converter and a line-side converter, and at least one control element is provided for controlling the indirect converter. The invention also relates to a method for controlling a double-fed asynchronous machine, preferably for a power plant. Furthermore, the invention relates to a computer program, a computer program product, and to a wind or water power plant for generating electrical energy with a double-fed asynchronous machine.

BACKGROUND OF THE INVENTION

Double-fed asynchronous machines are usually used in plants which have a variable rotor speed, particularly in wind or water power plants. The use of an indirect converter which is connected to the rotor makes it possible to control the rotor voltage such that the frequency and phase position of the stator voltage remains constant in spite of a variable rotor speed. Thus, the stator can be connected to the mains directly or via a transformer. The relevant standards for the limits of harmonic system reactions necessitate the use of line filters for the double-fed system. As a function of the impedances of the mains and the design of the line filter, resonance characteristics of the controlled system arise which, in some cases, can lead to instability of the entire system of controlled system and control system which affects both the control system for the rotor-side converter and the control system for the line-side converter. The likelihood of such instabilities increases with an increasing number of individual filters connected in parallel and, particularly in the case of large wind farms, can result in the disconnection of plants and also in the destruction of components. In the prior art, to dampen such resonances, specifically configured line filters which are adapted to the respective plant site and have an unchangeable frequency-dependent damping are incorporated during delivery of the system or during installation thereof, such line filters being described, for example in Durstewitz et al., "Netzspezifische Filterauslegung", Kasseler Symposium Energie-Systemtechnik 1998.

In a wind farm, the likelihood of an instability occurring changes if the wind farm is expanded by a new wind power plant or if a wind power plant is separated from the mains, e.g. for maintenance purposes. It is even possible for new resonances to arise in the system as a result of such changes. As a result, the line filters known hitherto from the art are no longer optimally adapted to the altered resonance characteristics of the system and no longer adequately dampen the resonances, thus entailing an increased likelihood of instabilities arising in the system.

If necessary, the line filter will even have to be removed and a new line filter with a fixed frequency-dependent damping adapted to the new resonance characteristics of the system will have to be installed. This is associated with high costs.

BRIEF SUMMARY OF THE INVENTION

In light of the above, one object of the present invention is to provide a device for controlling a double-fed asynchronous machine in which the damping can be adapted to changed resonance characteristics.

The technical object is achieved according to one embodiment of the invention in that at least one software-based and/or hardware-based damping element is provided which has changeable damping characteristics. Further embodiments are set out in the subclaims.

In this way, in the event of a change in the resonance characteristics of a system with a double-fed asynchronous machine and a controlled indirect converter, it is possible for the damping characteristics of the at least one damping element to be able to be adapted to different resonance characteristics of the mains. This avoids a costly replacement of a line filter.

In a preferred embodiment of the device, the damping characteristics of the a least one damping element can be variably adjusted within a frequency range of up to 2000 Hz, preferably up to 1200 Hz. It has been found that critical resonances of a system with a double-fed asynchronous machine and a controlled indirect converter occur in a frequency range of up to 2000 Hz, in particular up to 1200 Hz. Limiting the frequency range makes it possible to use simple and economical damping elements.

In a preferred embodiment of the device, a particularly simple and inexpensive damping element is achieved in that the hardware-based damping element has at least one resistive and/or one inductive component, the impedance of which can be changed. In this respect, the embodiment with either one resistive or one inductive component, the impedance of which can be changed, is a particularly simple and inexpensive variant. The embodiment with a resistive component and an inductive component, the impedance of which can be changed in each case, provides a particularly great adaptability of the damping element. It is also conceivable for the damping element to have a capacitive component, the impedance of which can be changed.

In a further preferred embodiment of the device, the at least one resistive and/or inductive component has a plurality of taps or tappings. The magnitude of the resistor or of the inductor can be the same or different for the various taps or tappings and, depending on the desired damping characteristics, the taps or tappings can be connected in a variable manner. It is thus possible in a particularly simple manner for the damping element to have changeable damping characteristics. The damping characteristics can thus be influenced simply by the choice of taps or tappings of the resistor or inductor.

In a further preferred embodiment of the device, the damping characteristics are adapted to changed resonance characteristics of the mains in that a software-based line-side and/or rotor-side damping element is provided which generates a damping signal. As a result of this software-based adaptation of the damping characteristics, an adaptation to changed mains characteristics can be performed in a particularly simple and rapid manner. The term "mains characteristics" is understood as meaning in particular the resonance characteristics of the mains. The use of either a software-based rotor-side damping element or a software-based line-side damping element is particularly simple, since only one damping element has to be adapted. The use of a software-based rotor-side damping element and a software-based line-side damping element produces a particularly effective damping, because the system is damped both on the rotor side and on the mains side.

In a further preferred embodiment of the device, means are provided which generate in series or in parallel the actuating signal fed into the converter from the control signal generated by the control element and the damping signal. The term "actuating signal" is understood as meaning the signal by which the line-side and/or rotor-side converter is actuated. Thus, in the parallel generation, an addition module can be provided for example, in which the control signal and the damping signal are added together. In the serial generation of the actuating signal, the control signal serves as an input quantity of the damping signal, or vice versa.

A further preferred embodiment of the device is achieved in that means are provided by which the stator current $i_S$, the stator voltage $u_S$, the current of the rotor-side converter $i_{MSC}$, the mains current $i_G$ and/or the mains voltage $u_G$ are determined and are provided as input quantities at the rotor-side damping element. It has been found that these input quantities are particularly very suitable for generating the rotor-side damping signal especially due to their frequency responses. The current of the rotor-side converter or the stator current is preferably selected.

In a further preferred embodiment of the device, means are provided by which the current of the line-side converter $i_{LSC}$, the mains voltage $i_G$, the mains voltage $u_G$, the voltage of the line-side inverter branch of the three-phase transformer $u_{tr, LSC}$ and/or the stator voltage $u_S$ are determined and are provided as input quantities at the line-side damping element. It has been found that these input quantities are particularly very suitable for generating the line-side damping signal especially due to their frequency responses. The current of the line-side converter $i_{LSC}$ is preferably selected.

In a further embodiment of the device, a particularly good adaptation of the damping characteristics of the at least one damping element is achieved in that means are provided which can excite the controlled system of the indirect converter in a frequency range of up to 2000 Hz, preferably up to 1200 Hz. The phrase "controlled system of the indirect converter" is understood as meaning the system consisting of the double-fed asynchronous machine, the indirect converter, the associated control element, as well as optionally further connected components. Excitation of the controlled system makes it possible to measure the resonance characteristics of this system using the response of the system to this excitation. Excitation is preferably carried out in a frequency range up to 2000 Hz, in particular up to 1200 Hz, since particularly critical resonances of the system usually occur within this range. A frequency generator or a pulse generator is particularly suitable for the excitation of the controlled system.

In a further preferred embodiment of the device, means are provided which can calculate the damping function of at least one damping element. For example, the quantities, i.e. the system response, resulting from the measurement described above, of the resonance characteristics can be used as input quantities for this calculation. In this way, the damping characteristics of the damping element can be adapted in a particularly simple and rapid manner since the damping function, in particular the transfer function G (z) is calculated substantially automatically and a separate calculation of the damping function, for example on an additional computer, is not required. Particularly suitable for the calculation means is a module which is controlled by a microprocessor and preferably contains an electronic memory with instructions, the implementation of which by the microprocessor brings about the calculation of the damping function. This embodiment is particularly advantageous when combined with the features of the embodiment in which means are provided by which the controlled system of the indirect converter can be excited within a frequency range of up to 2000 Hz, preferably up to 1200 Hz. Thus, for example it is conceivable that as a result of the excitation of the controlled system, the resonance characteristics of the system are determined, from which a suitable damping function can then be directly calculated by the means for calculating the damping function.

In a further preferred embodiment of the device, an effective damping of resonances is achieved in that at least one damping element produces a phase shift which results in a damping action.

In a further preferred embodiment of the device, at least one damping element produces an additional phase advance which is substantially constant over the entire frequency range of up to 2000 Hz, preferably up to 1200 Hz. The advantage of this embodiment is that the improvement in the stability characteristics is produced in a greater frequency range such that in very many cases, an individual adaptation of the software-based damping element to the respectively different resonance characteristics of the mains becomes superfluous and instead, a constant parameterisation of the software-based damping element is possible for most of the mains configurations and characteristics. In this manner, it is also possible to compensate for dead times of the control element.

In a further preferred embodiment of the device, the adaptation of the damping characteristics is simplified in that at least one damping element is provided which has unchangeable damping characteristics. In this manner, it is possible for resonances which are only slightly dependent on the mains characteristics to be damped. Consequently, the damping element which has changeable damping characteristics only has to be adapted for the other resonances. This makes it possible to use relatively simple damping elements.

Furthermore, the technical object is achieved with a method in that hardware-based and/or software-based damping elements are provided which have changeable damping characteristics, and the damping characteristics of at least one hardware-based and/or software-based damping element are adapted subsequently. Further embodiments are set out in the subclaims.

It is thus possible to dispense with an expensive subsequent replacement of a hardware-based line filter with a fixed frequency-dependent damping. This means that costs can be saved.

The damping characteristics are preferably adapted in each case after the mains characteristics have changed. It is thus possible to react immediately to a change in mains characteristics. The replacement of hardware-based line filters with a fixed frequency-dependent damping is therefore avoided.

In a further preferred embodiment of the method, a particularly effective and rapid damping of the resonances in the system is achieved in that the controlled system is excited in a frequency range of up to 2000 Hz, preferably up to 1200 Hz, the response function of the controlled system is measured and at least one damping element is adapted as a function of the response function. In this manner, it is possible to substantially or completely automate the adaptation of the damping element. The damping element can thus be adapted in a simple and rapid manner. Thus it is conceivable for the method to be applied once during installation of the plant, at regular intervals or as required in each case and for the damping of the resonances in the system to be optimised.

In a further preferred embodiment of the method, the stator current $i_S$, the stator voltage $u_S$, the current of the rotor-side converter $i_{MSC}$, the current of the line-side converter $i_{LSC}$, the voltage of the line-side inverter branch of the three-phase transformer $u_{tr,LSC}$, the mains current $i_G$ and/or the mains voltage $u_G$ are determined and at least one damping element generates a damping signal which is dependent on a least one of these quantities. It has been found that these input quantities are particularly suitable for generating the line-side and/or rotor-side damping signal especially due to their frequency responses.

In a further embodiment of the method, a particularly effective damping of the resonances is achieved in that the damping signal is calculated in dq-coordinates which are moved together with the mains frequency. In this manner, the steady state of the control, i.e. the state in which only the mains frequency occurs, is at 0 Hz. The transfer function can then simply be selected such that the damping is zero at this frequency.

In a further preferred embodiment of the method, the line-side and/or rotor-side actuating signal fed into the converter is generated, in particular by addition, from a damping signal and the line-side and/or rotor control signal, in which case a respective damping element is optionally provided for generating the damping signal. The advantage of this embodiment is based on the fact that the control signal of the control element can be actively and directly influenced in order to change damping characteristics.

In a further preferred embodiment of the method, a particularly simple charging of the system with the damping signal is achieved in that the combination, in particular the addition of the damping signal and the control signal takes place in stationary ab-coordinates. This is advantageous because the control signal is usually already present in ab-coordinates and thus no transformation of the control signal into another coordinate system is required.

The object on which the invention is based is also achieved by a computer program, said computer program having instructions, the implementation of which is initiated by a processor to carry out the method according to the invention for controlling a double-fed asynchronous machine. The presented control method for software-based damping elements is very well suited to implementation on a microprocessor which receives, for example as input quantities, the stator current $i_S$, the stator voltage $u_S$, the current of the rotor-side converter $i_{MSC}$, the current of the line-side converter $i_{LSC}$, the voltage of the line-side inverter branch of the three-phase transformer $u_{tr,LSC}$, the mains current $i_G$ and/or the mains voltage $u_G$ and outputs the damping signal as an output quantity. A subsequent adaptation of the damping function is thus possible. This can be carried out, for example after fixed intervals or as required.

The object on which the invention is based is also achieved by a computer program product, said computer program product containing a computer program with instructions, the implementation of which is initiated by a processor to carry out the method according to the invention. The computer program product can be, for example a removable disc such as a memory card, a floppy disc or a CD on which at least one computer program is saved with the instructions for implementing the method according to the invention.

Finally, the object on which the invention is based is achieved by a wind or water power plant for generating electrical energy with a double-fed asynchronous machine, in which a device according to the invention is provided.

BRIEF DESCRIPTION OF THE DRAWINGS

Further features and advantages of the present invention are described in more detail in the description of the exemplary embodiments. In the drawings.

DETAILED DESCRIPTION OF THE INVENTION

Figure 1:
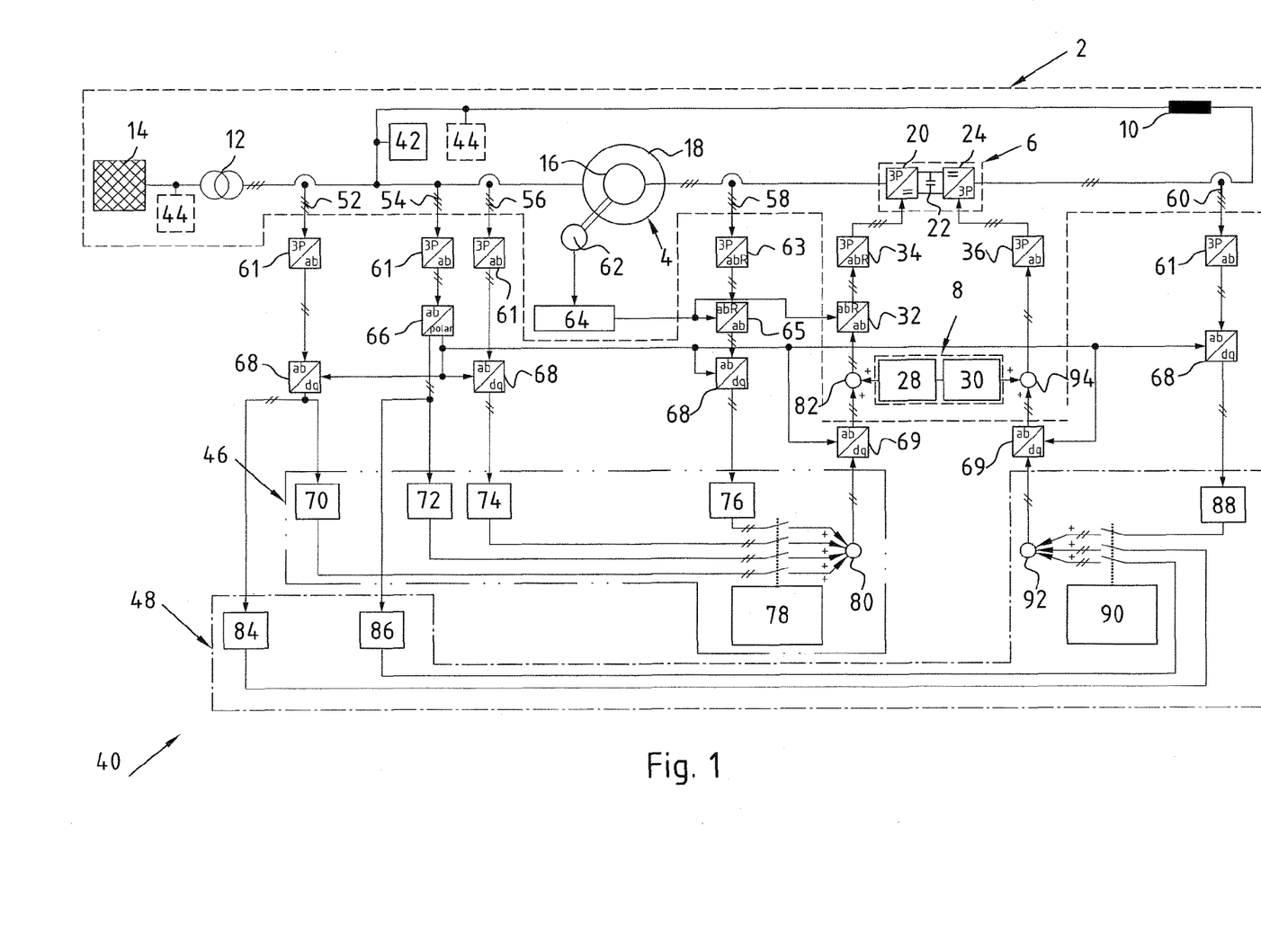
FIG. 1 shows a block diagram of a first exemplary embodiment of a device according to the invention for controlling a double-fed asynchronous machine.

FIG. 1 is a block diagram of a first exemplary embodiment of a device according to the invention for controlling a double-fed asynchronous machine 4. In the illustrated exemplary embodiment, the double-fed asynchronous machine 4 is arranged in a system 2, said system comprising an indirect converter 6, a controlling element 8, a choke 10, an optional transformer 12 and a mains 14. The double-fed asynchronous machine 4 can be used, for example, in a wind power plant or a water power plant for generating electrical energy. It has a rotor 16 and a stator 18. The indirect converter 6 has a rotor-side converter 20, an intermediate circuit 22 and a line-side converter 24, the rotor-side converter 20 being electrically connected to the intermediate circuit 22 and the intermediate circuit 22 being electrically connected to the line-side converter 24. The rotor 16 is electrically connected to the rotor-side converter 20. The choke 10 is electrically connected to the line-side converter 24 and to the stator 18. The control element 8 has a rotor-side control element 28 and a line-side control element 30. The control signals are generated in the control element 8 in stationary ab-coordinates. Therefore, a transformation into rotor-fixed abR coordinates using an ab/abR transducer 32 is required for the control of the rotor-side converter. The input quantity, required for this transformation, of the rotor position is determined via a rotary meter 62 connected to the rotor 16 and is forwarded to the ab/abR transducer 32 via a valuator 64 connected thereto. The abR/3P transducer 34 transforms the control signal from the abR-coordinate system into the three-phase 3P-coordinate system. The ab/3P transducer 36 directly transforms the control signal from the ab-coordinate system into the 3P-coordinate system. The system 2 described hitherto is the prior art system. According to the present exemplary embodiment of the device according to the invention, the block diagram shown in FIG. 1 illustrates a software-based damping element 40 and an optional hardware-based damping element 44. The hardware-based damping element 44 can be configured, for example like the damping element shown in FIG. 6. A line filter 42 with unchangeable damping characteristics is also provided.

The software-based damping element 40 has a rotor-side damping element 46 and a stator-side damping element 48. The measured quantities of mains current $i_G$ 52, stator voltage $u_S$ 54, stator current $i_S$ 56, the current of the rotor-side converter $i_{MSC}$ 58 and the current of the line-side converter $i_{LSC}$ 60 are initially transformed into stationary ab-coordinates using a respective 3P/ab transducer 61 or a 3P/abR transducer 63 and an abR/ab transducer 65. Furthermore, the stator voltage $u_S$ is transformed into the polar coordinate system via an ab/polar transducer 66. The values for the mains current $i_G$, the stator current $i_S$, the rotor current $i_{MSC}$ and the choke current $i_{LSC}$ are also transformed from the ab-coordinate system into the dq-coordinate system rotating at mains frequency by ab/dq transducer 66. The value of the phase of the stator voltage required for this transformation is transmitted from the ab/polar transducer 66 to all ab/dq transducers 68. The values of the mains current $i_G$, the stator voltage $u_G$, the stator current $i_S$ and the current of the rotor-side converter $i_{MSC}$ are present as input quantities at the rotor-side damping element 46. The rotor-side damping element has modules 70, 72, 74 and 76, into which in each case one of the present input quantities is fed and the respective output quantity is calculated by means of an associated transfer function. Module 70 determines an associated output quantity from the input quantity of the mains current $i_G$ with the time-discrete transfer function $G_{uS,r}[z]$. In an analogous manner, module 72 calculates the respective associated output quantity according to $G_{uS,r}[z]$ from the stator voltage $u_S$, module 74 calculates the respective associated output quantity according to $G_{iS,r}[z]$ from the stator current $i_S$ and module 76 calculates the respective associated output quantity according to $G_{iMSC,r}[z]$ from the current of the rotor-side converter $i_{MSC}$. The transfer functions are preferably selected such that the resonances of the system 2 are damped on the rotor side by the damping element 46.

In the adder 80, the signals calculated in the modules 70, 72, 74 and 76 are selectively added together. The signals are selected by the block 78. The mains states and the available sensor technology, for example, are considered during the selection process. In this way, the generation of the damping signal can be adapted to the input quantities with the best transmission characteristics. Using a dq/ab transducer 69, the rotor-side damping signal is then transformed from synchronous dq-coordinates into ab-coordinates so that it can be added to the signal, also present in ab-coordinates, of the rotor-side control element 28 in the addition module 82. In this manner, the control signal of the control element 28 is actively and directly influenced in order to change the damping characteristics. The values of the mains current $i_G$ 52, the stator voltage $u_S$ 54 and the current of the line-side converter $i_{LSC}$ 60 are present as input quantities at the modules 84, 86 and 88.

Module 84 determines an associated output quantity from the input quantity of mains current $i_G$ with the discrete-time transfer function $G_{iG,s}[z]$. In an analogous manner, module 86 calculates an associated output quantity from the stator voltage $u_S$ according to $G_{uS,s}[s]$ and module 88 calculates an associated output quantity from the current of the line-side converter $i_{LSC}$ according to $G_{iLSC,s}[z]$. The transfer functions are selected such that the resonances of system 2 are damped on the mains side by the damping element 48. In the adder 92, the signals calculated in modules 84, 86 and 88 are selectively added together. The signals are selected by the block 90 which is comparable to block 78. Using a dq/ab transducer 69, the line-side damping signal is then transformed into ab-coordinates so that it can be added to the signal, also present in ab-coordinates, of the line-side control element 30 in the addition module 94.

Figure 2:
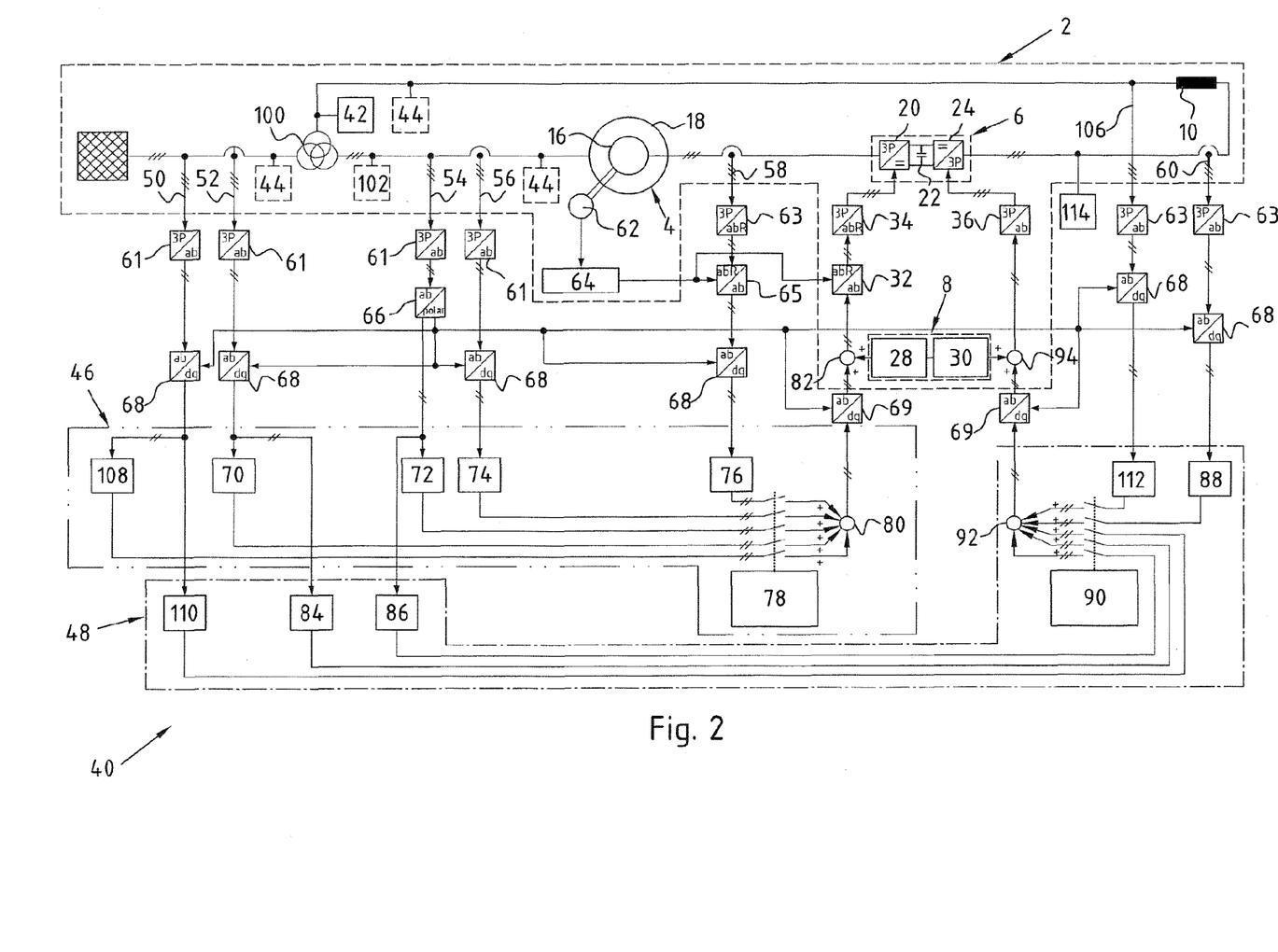
FIG. 2 shows a block diagram of a second exemplary embodiment of a device according to the invention for controlling a double-fed asynchronous machine.

FIG. 2 shows a block diagram of a second exemplary embodiment of a device according to the invention for controlling a double-fed asynchronous machine 4. The second exemplary embodiment is particularly suitable for multi-megawatt wind power plants. Unlike the first exemplary embodiment, a three-winding transformer 100 is used to connect the double-fed asynchronous machine 4 to the mains. Thus, the illustrated exemplary embodiment is also suitable for the output of very high electrical power. A further filter 102 is also connected in the stator branch. The further filter can have, for example, a hardware-based damping element with unchangeable damping characteristics tapped between the choke 10 and the transformer 100 is the voltage of the line-side inverter branch $u_{tr,\,LSC}$ 106 which is transformed into dq-coordinates by two transducers 36, 38. The mains voltage uG 50 is also transformed into dq-coordinates by two transducers 36, 38. In module 108, with transfer function $G_{uG,r}[z]$ and the mains voltage $u_G$, a further signal is generated which can be selectively added to the previously described signals of the rotor-side damping element 46. The line-side damping element 48 is expanded by two further signals which can be selectively added together. One of these signals is the signal generated from mains voltage uG and from transfer function $G_{uG,s}[z]$ in module 110 and the other is the signal generated from the voltage of the line-side inverter branch of the three phase transformer $u_{tr,LSC}$ and from transfer function $G_{utr,LSC,s}[z]$ in module 112. In FIG. 2, an optional excitation element 114 is also provided which can alternatively also be connected in a different place. The excitation element has a signal transmitter which can generate a signal in a frequency range of up to 2000 Hz, preferably up to 1200 Hz and can thus excite the controlled system of the indirect converter. The excitation element 114 can also have measuring devices which measure the response function of the controlled system. The excitation element 114 can contain, for example, an electronic circuit, in particular a microprocessor and a memory with instructions which calculate new transfer functions for modules 70, 72, 74, 76, 84, 88, 110 from the measured response function of the controlled system and feed them into said modules via an electrical data connection (not shown).

Figure 3:
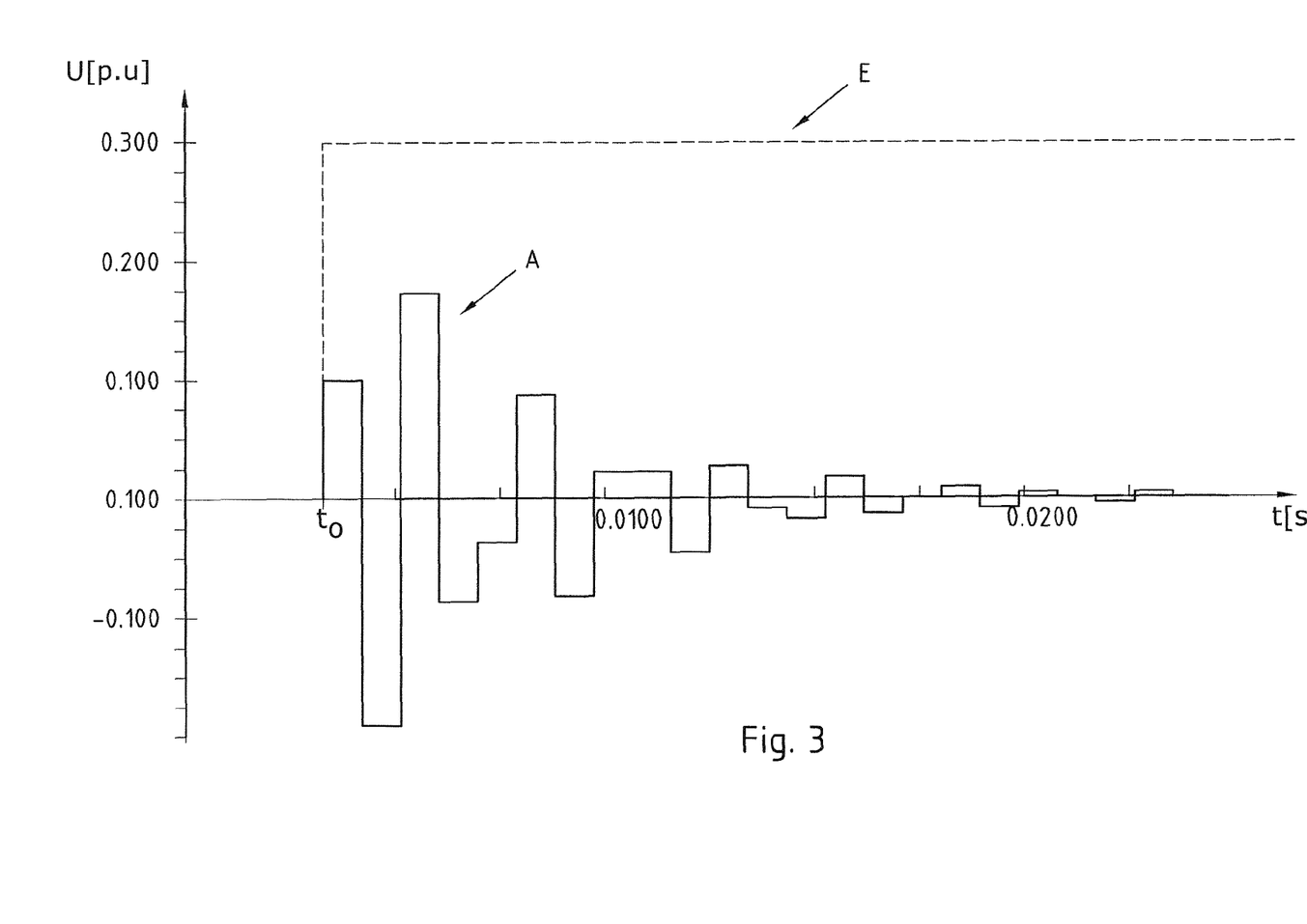
FIG. 3 shows a diagram with the step response for a third exemplary embodiment of a transfer function.
Figure 4:
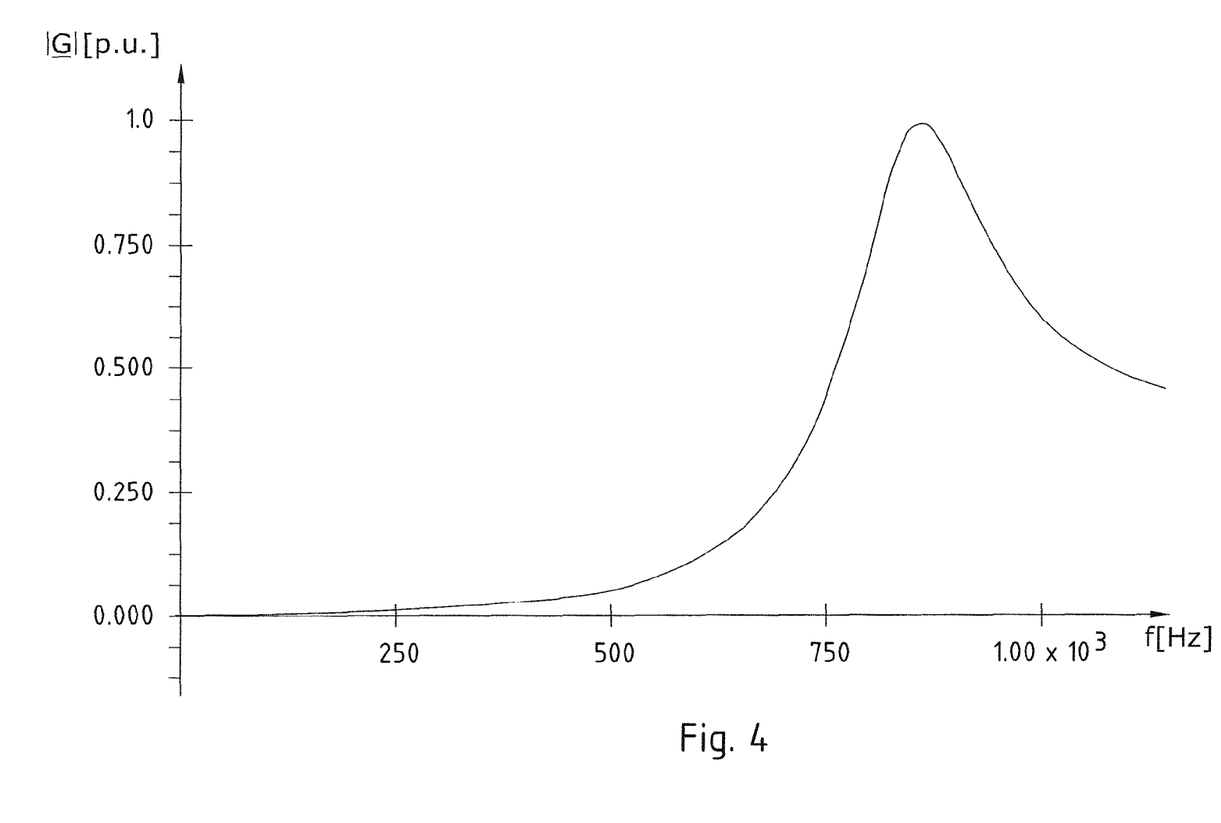
FIG. 4 shows a diagram with the frequency response of the amplitude of the exemplary embodiment of FIG. 3.
Figure 5:
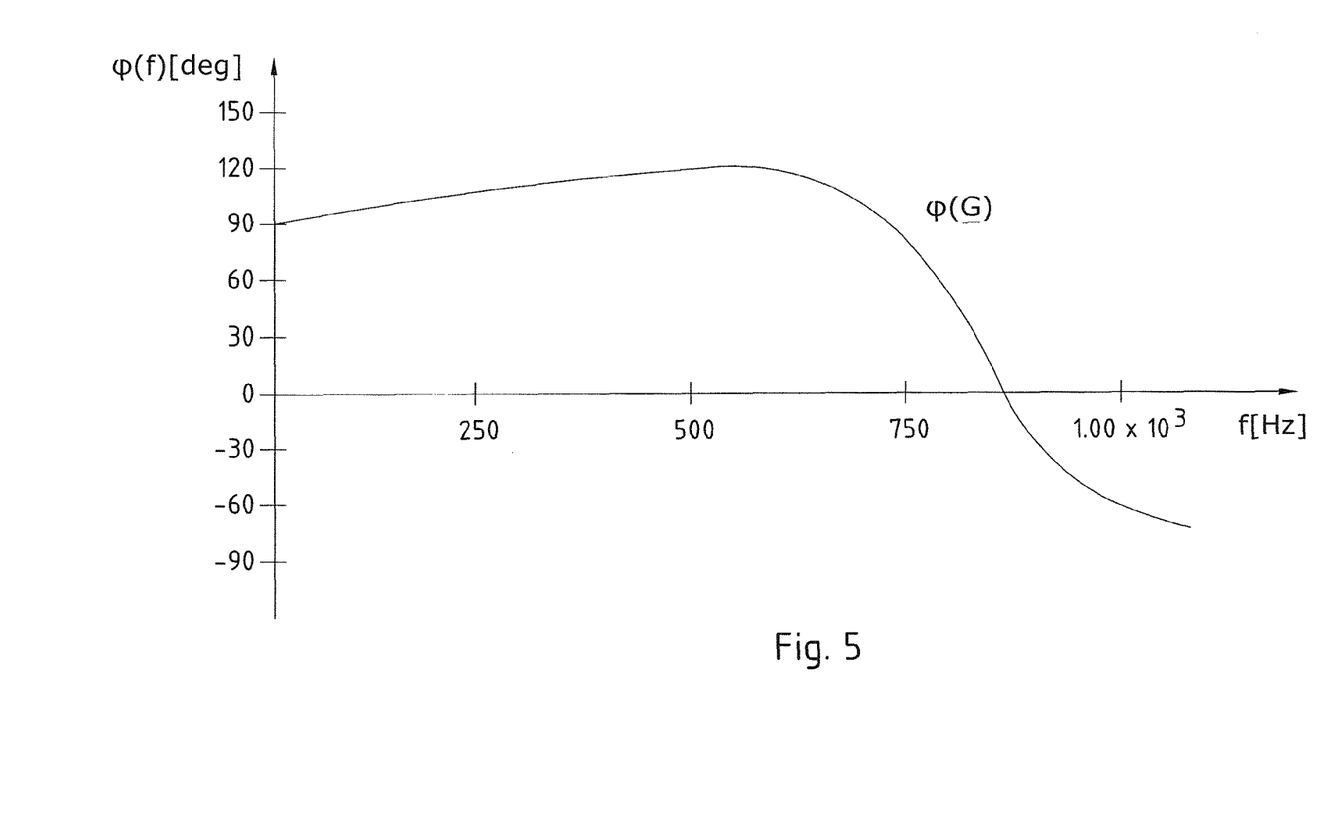
FIG. 5 shows a diagram with the frequency response of the phase of the exemplary embodiment of FIG. 3.

FIG. 3 to 5 show calculated results of an exemplary embodiment. The following discrete function can be selected as transfer function $G(z)$:

$$G(z) = \frac{A(z^{-1})}{E(z^{-1})} = \frac{\sum_{j=1}^{m}(1+\underline{C}_j \cdot z^{-1})^j - \sum_{j=1}^{m}(1+\underline{C}_j)^j}{1+\sum_{k=1}^{n}\underline{D}_k \cdot z^{-k}} \cdot \underline{V} \quad (1)$$

where $$\underline{V} = V \cdot e^{j\psi} \quad (2)$$

In this equation, A is the output quantity and E is the input quantity of the associated module, $\underline{C}_j$ and $\underline{D}_k$ are selectable complex parameters and $\underline{V}$ is a selectable complex net gain. With a suitable choice of coefficients $\underline{C}_j$ and $\underline{D}_k$, the associated damping element produces a damping of resonances or instabilities which arise in system 2 due to the interaction between the control 8 and the mains 14 and the line filter (not shown).

For example, in the case of a control system with a sampling frequency of 2250 Hz and instabilities ranging between 600 Hz and 800 Hz, a damping element is suitable which has a module with a transfer function according to equation (1) with the following parameters:

m=5
$C_2 = -0.8$
$C_5 = -0.6$
$C_1 = C_3 = C_4 = 0$
and
n=3
$D_1 = 0.5$
$D_2 = 0$
$D_3 = -0.4$ FIG. 3 shows the step response for this module. The time t in seconds is plotted on the abscissa and the voltage U in p.u. is plotted on the ordinate. The input quantity E is switched on from 0 to the value 0.3 at a time $t_0$ and then remains constant. Thereupon, the output quantity A exhibits a damped, oscillating path. After 0.02 seconds, A is almost completely damped. It is thus apparent that the corresponding module has a stable step response. This is advantageous, since in this way, the damping element is prevented from introducing additional instabilities into the system 2.

FIG. 4 shows the frequency response of the amplitude of the damping element. The frequency f in Hertz is plotted on the abscissa and the amount G of amplitude in p.u. is plotted on the ordinate. It can be seen that the amplitude has a significant output quantity in the range of approximately 600 to more than 1000 Hz.

FIG. 5 shows the associated frequency response of the phase. The frequency f in Hertz is plotted on the abscissa and the phase φ in degrees is plotted on the ordinate.

The steady state of the control corresponds to 0 Hz in the dq-coordinate system. The damping element is configured such that no output quantity is generated at 0 Hz. Thus, the standard control is not influenced in the steady state. In the active frequency range of the damping, this contributes to a significant stabilisation of the entire system.

The amplitude and the phase position of the damping signal can be adapted by changing the complex net gain $\underline{V}$ into amount V and angle ψ.

Figure 6:
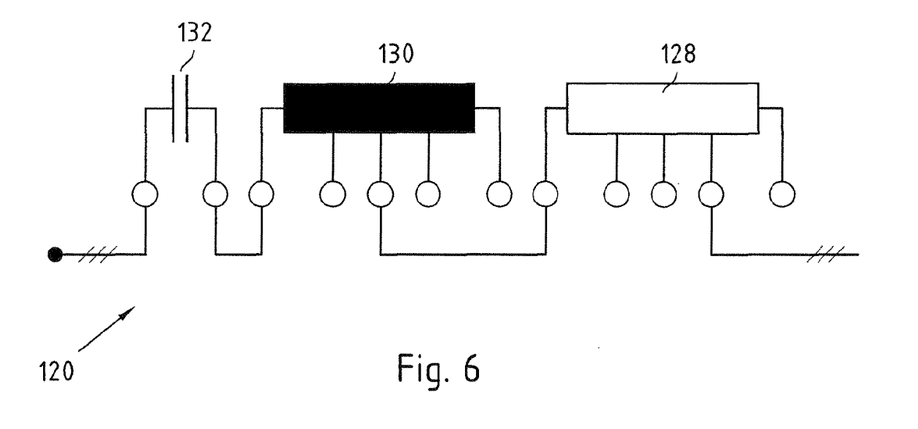
FIG. 6 shows a block diagram of a fourth exemplary embodiment for a hardware-based damping element.

FIG. 6 shows an exemplary embodiment for a hardware-based damping element 120. In each of the three phase branches, this hardware-based damping element 120 has a resistor 128 with different taps, an inductor 130 with different tappings and a capacitor 132. It is thus possible to adapt the damping behaviour to different conditions. Alternatively, the capacitor 132 could also have different taps or different capacitors could be kept available.

Figure 7:
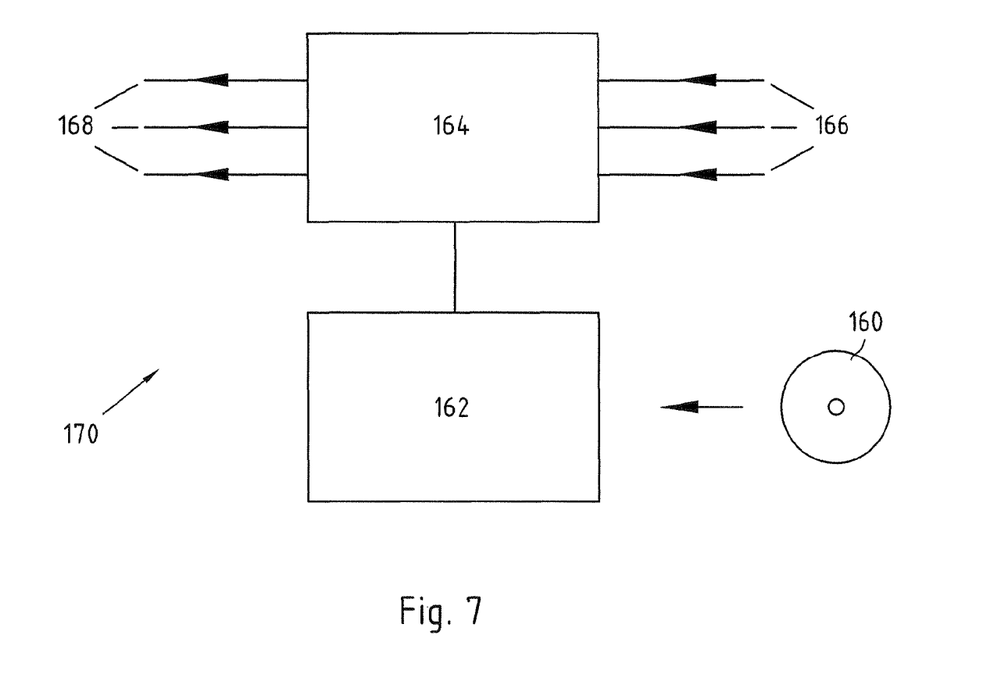
FIG. 7 shows a block diagram of a fifth exemplary embodiment for implementing a method for controlling a double-fed asynchronous machine with a computer program by a processor.

FIG. 7 is a block diagram of an exemplary embodiment for implementing a method for controlling a double-fed asynchronous machine with a computer program by a processor. The computer program is firstly stored on a data carrier 160 and is downloaded into the memory 162 via a suitable data carrier reader (not shown). The memory 162 is connected to a processor unit 164 which has a processor which implements the instructions stored in the computer program. The processor unit also has one or more inputs 166 via which input quantities can pass into the processor unit 164. The processor unit 164 also has at least one or more outputs 168. The output quantities required for modules 70, 72, 74, 76, 84, 88, 108, 110, for example, can be calculated in an arithmetic-logic unit 170 of this type with a processor unit 164 and a memory 162. The transfer function G(z) associated with the module is implemented in the computer program. The processor unit 164 receives via the inputs 166 the input quantities which belong to the module and using which the associated output quantities are calculated by implementing the instructions of the computer program in the processor unit 164. New transfer functions for modules 70, 72, 74, 76, 84, 88, 108, 110 can also be calculated in such an arithmetic-logic unit 170 in that an algorithm is implemented in the computer program which uses the response function, produced by the excitation element 114, of the controlled system to calculate the new transfer functions. The processor unit 164 receives via the input 166 the response function of the controlled system using which the new transfer functions are calculated by carrying out the instructions of the computer program in the processor unit 164. These new transfer functions can then be used for the corresponding modules 70, 72, 74, 76, 84, 88, 108, 110.

Figure 8:
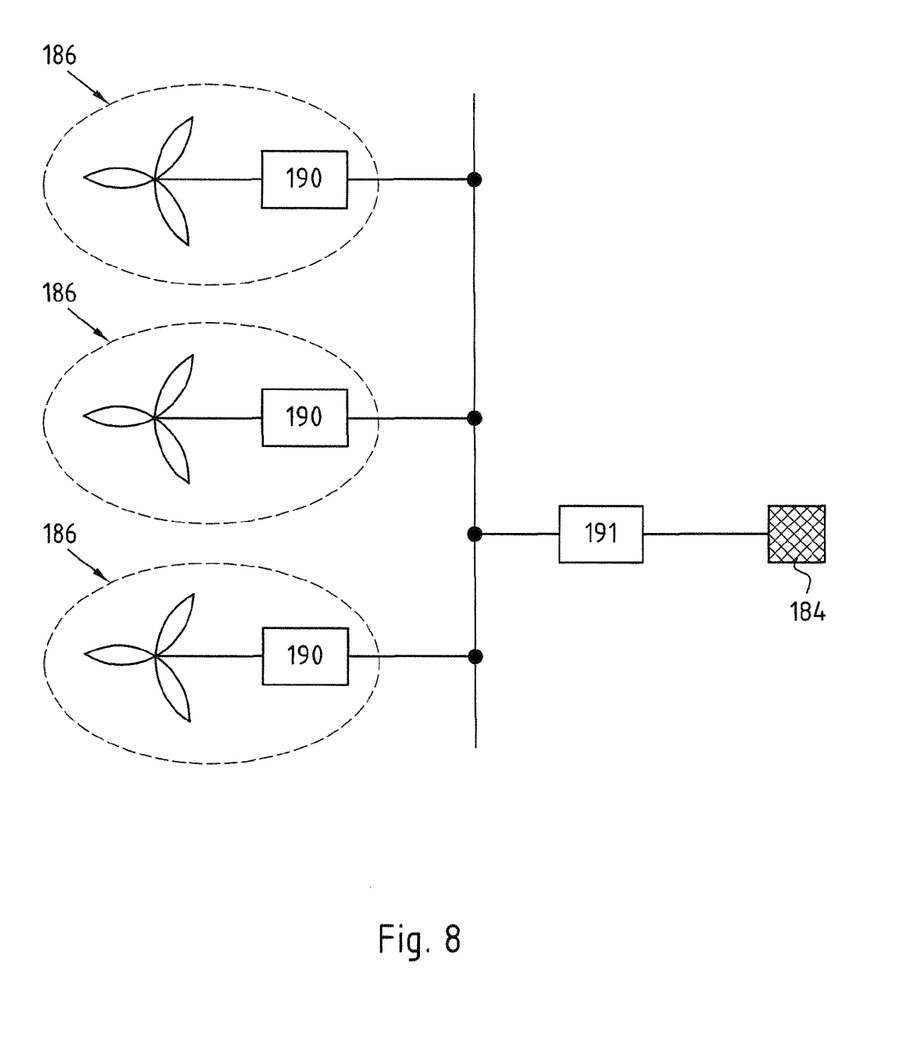
FIG. 8 shows a block diagram of an exemplary embodiment of a wind farm comprising wind power plants with a device according to the invention for controlling a double-fed asynchronous machine.

FIG. 8 shows a wind farm with a plurality of wind energy plants 186 which are equipped with a device 190 according to the invention and are connected to a mains 184 via a common connection point 191. Alternatively, it is also possible for the device 190 according to the invention not to be installed in each individual wind energy plant 186, but in the common connection point 191. The resonance characteristics of this system can be influenced by the characteristics of the mains 184. However, they can also change, for example, if a further wind power plant is connected to the connection point 191 or if an existing wind power plant 186 is disconnected from the connection point 191. In these cases, the device 190 according to the invention can be adapted to the new resonance characteristics.

The invention claimed is:

1. A Device for controlling a double-fed asynchronous machine (4), preferably for a power plant, in particular for a wind or water power plant, comprising:
    an indirect converter (6) which is connected on the rotor side to the double-fed asynchronous machine (4), the indirect converter (6) comprising a rotor-side converter (20) and a line-side converter (24), and at least one control element (8) is provided for controlling the indirect converter (6); and
    wherein at least one software-based and/or hardware-based damping element (40, 46, 48, 120) is provided which has damping characteristics which can be adapted to changed mains resonance characteristics.

2. The Device of claim 1, wherein the damping characteristics of the at least one damping element (40, 46, 48, 120) can be variably adjusted within a frequency range of up to 2000 Hz, preferably up to 1200 Hz.

3. The Device of claim 1, wherein the hardware-based damping element (120) has at least one resistive component (128) and/or one inductive component (130), the impedance of which can be changed.

4. The Device of claim 3, wherein the at least one resistive component (128) and/or inductive component (130) has a plurality of taps or tappings.

5. The Device of claim 1, wherein at least one software-based line-side and/or rotor-side damping element (46, 48) is provided which generates a damping signal.

6. The Device of claim 1, wherein means (82, 94) are provided which generate in series or in parallel an actuating signal, fed into the converter, from the control signal generated by the control element and the damping signal.

7. The Device of claim 1, wherein means are provided by which at least one of a stator current $i_S$, a stator voltage $u_S$, a current of the rotor-side converter $i_{MSC}$, a mains current $i_G$ and a mains voltage $u_G$ are determined and are provided as input quantities at the rotor-side damping element (46).

8. The Device of claim 1, wherein means are provided by which at least one of a current of the line-side converter $i_{LSC}$, a mains current $i_G$, a mains voltage $u_G$, a voltage of a line-side inverter branch of the three-phase transformer $u_{tr,LSC}$ and a stator voltage $u_S$ are determined and are provided as input quantities at the line-side damping element (48).

9. The Device of claim 1, wherein means (114) are provided by which a controlled system of the indirect converter (6) can be excited within a frequency range of up to 2000 Hz, preferably up to 1200 Hz.

10. The Device of claim 1, wherein means are provided which can calculate the damping function of at least one damping element (40, 46, 48, 120).

11. The Device of claim 1, wherein at least one damping element (40, 46, 48, 120) produces an additional phase advance which is substantially constant over the entire frequency range of up to 2000 Hz, preferably up to 1200 Hz.

12. The Device of claim 1, wherein at least one damping element (44) is provided which has unchangeable damping characteristics.

13. A Method for controlling a double-fed asynchronous machine (4), preferably for a power plant, in particular for a wind or water power plant comprising an indirect converter (6) and a device according to claim 1, comprising:
    a step in which mains resonance characteristics are determined, in particular measured, wherein hardware-based and/or software-based damping elements (40, 46, 48, 120) are provided which have changeable damping characteristics; and
    a step in which the damping characteristics of at least one hardware and/or software-based damping element (40, 46, 48, 120) are subsequently adapted to changed mains resonance characteristics.

14. The Method according to claim 13, wherein the controlled system is excited within a frequency range of up to 2000 Hz, preferably up to 1200 Hz, a response function of the controlled system is measured and at least one damping element (40, 46, 48, 120) is adapted as a function of the response function.

15. The Method of claim 13, wherein at least one of a stator current $i_S$, a stator voltage $u_S$, a current of the rotor-side converter $i_{MSC}$, the current of the line-side converter $i_{LSC}$, a voltage of a line-side inverter branch of the three-phase transformer $u_{tr,LSC}$, a mains current $i_G$ and a mains voltage $u_G$ are determined and in that a damping signal which is dependent on at least one of these quantities, is generated by at least one damping element (40, 46, 48).

16. The Method according to claim 15, wherein the damping signal is calculated in dq-coordinates which are moved together with the mains frequency.

17. The Method of claim 13, wherein an actuating signal fed into the converter on the line side and/or on the rotor side is generated, in particular by addition, from a damping signal and the line-side and/or rotor-side control signal, a damping element (40, 46, 48) being optionally provided to generate the damping signal.

18. The Method of claim 17, wherein an addition of the damping signal and the control signal takes place in stationary ab-coordinates.

19. The Method of claim 13, embodied in a computer program with instructions, a step of which induces a processor to carry out the method.

20. The Method of claim 13, embodied in a computer program product which contains a computer program with instructions, a step of which induces a processor to carry out the method.

21. A wind or water power plant for generating electrical energy, with a double-fed asynchronous machine, comprising a device according to claim 1.

* * * * *